US012277789B2

(12) United States Patent
Stoicescu et al.

(10) Patent No.: US 12,277,789 B2
(45) Date of Patent: Apr. 15, 2025

(54) SMART OPTICAL CHARACTER RECOGNITION TRAINER

(71) Applicant: Innovative Computing & Applied Technology LLC, Reston, VA (US)

(72) Inventors: Radu Stoicescu, Braselton, GA (US); Jesse Osborne, Burtonsville, MD (US)

(73) Assignee: Innovative Computing & Applied Technology LLC, Reston, VA (US)

( * ) Notice: Subject to any disclaimer, the term of this patent is extended or adjusted under 35 U.S.C. 154(b) by 346 days.

(21) Appl. No.: 17/864,929

(22) Filed: Jul. 14, 2022

(65) Prior Publication Data

US 2024/0020999 A1   Jan. 18, 2024

(51) Int. Cl.
*G06V 30/19* (2022.01)
*G06F 16/25* (2019.01)
*G06V 30/18* (2022.01)

(52) U.S. Cl.
CPC ...... *G06V 30/19173* (2022.01); *G06F 16/254* (2019.01); *G06V 30/18* (2022.01)

(58) Field of Classification Search
CPC .. G06V 30/19173; G06V 30/18; G06V 30/41; G06V 30/10; G06F 16/254; G06F 16/93
USPC ........................................................ 382/159
See application file for complete search history.

(56) References Cited

U.S. PATENT DOCUMENTS

| | | | | |
|---|---|---|---|---|
| 10,832,046 | B1* | 11/2020 | Al-Gharaibeh | G06T 5/60 |
| 2012/0128250 | A1* | 5/2012 | Petrou | G06V 30/413 |
| | | | | 382/182 |
| 2019/0236102 | A1* | 8/2019 | Wade | G06F 40/205 |
| 2019/0286898 | A1* | 9/2019 | Powell | G06F 16/22 |
| 2023/0137748 | A1* | 5/2023 | Song | G06V 10/993 |
| | | | | 382/112 |
| 2023/0368556 | A1* | 11/2023 | Jha | G06V 30/41 |

* cited by examiner

*Primary Examiner* — Tom Y Lu
*Assistant Examiner* — Pardis Sohraby
(74) *Attorney, Agent, or Firm* — Michael P. Fortkort, Esq.; Protorae Law PLLC

(57) ABSTRACT

A Smart Optical Character Recognition (SOCR) Trainer comprises software developed for automating Quality Control (QC) using unsupervised machine-learning techniques to analyze, classify, and optimize textual data extracted from an image or PDF document. SOCR Trainer serves as a 'data treatment' utility service that can be embedded into data processing workflows (e.g., data pipelines, ETL processes, data versioning repositories, etc.). SOCR Trainer performs a series of automated tests on the quality of images and their respective extracted textual data to determine if the extraction is trustworthy. If deficiencies are detected, SOCR Trainer will analyze certain parameters of the document, perform conditional optimizations, re-perform text extraction, and repeat QA testing until the output meets desired specifications. SOCR Trainer will produce audit files recording the provenance and differences between original documents and enhanced optimized document text.

19 Claims, 7 Drawing Sheets

FIG. 5

SMART OPTICAL CHARACTER RECOGNITION TRAINER

BACKGROUND

The present invention relates generally to automatic character recognition apparatuses, and more particularly to an automatic character recognition apparatus that uses specialized algorithms to process low quality images.

Many organizations undergoing the process of digitalization (i.e., transforming human-bound processes into computerized automation) face challenges because of their dependencies on non-digital information such as analog artifacts (e.g., physical paper, photographs, etc.). The first step towards digitalization is the digitization of analog artifacts (i.e., scanning/photocopying documents, conversion to microfilm/microfiche, etc.) by capturing digital images as raster files (i.e., images represented as grid arrays of pixels).

At the time of digitization, it is common practice to also perform Optical Character Recognition (OCR) processing on textual data in a raster file in order to extract textual data in the form of encoded characters that word processing software can utilize. Due to a wide variety of reasons the resultant data capture from the OCR can fail or produce low-quality output due to: (i) the poor quality of handling digitization (e.g., low-quality scanning equipment, improper usage of scanning equipment, etc.); (ii) poor quality OCR processing (e.g., software error, misjudgment of proper OCR method or settings, misinterpretation of alpha and/or numeric characters, etc.); and/or (iii) the inadequate condition of the original analog source (e.g., decomposing paper, imperfections due to age, creasing or mishandling, manual redactions, dirt/smudge/ink blots, handwritten notes, etc.).

Low-quality output from a document's OCR process lends credence to the old adage "Garbage in, Garbage out". Oftentimes low-quality OCR output will produce random characters in an illogical order (i.e., meaningless 'gibberish') and is unusable for any meaningful work. Organizations using the low-quality output of a document's OCR process can render any databases or information processing and management workflow an impossibility due to data corruption. Customers that are unable to overcome this challenge are unable to undergo digital transformation and can be outcompeted by digital-first competitors that are faster, more accurate, and lower cost/lower price.

Low quality images prevent automated programs that scan paper documents using character recognition techniques from producing low error electronic versions of these documents. As a result, human intervention is often required, or the resulting electronic files are not suitable for data mining or other automated data processing techniques.

The present invention is directed to the problem of developing an automated electronic scanning apparatus that can process low quality images yet produce suitable electronic versions of these low quality images for subsequent processing and storage.

SUMMARY OF THE INVENTION

The present invention solves these and other problems by providing an apparatus for performing optical character recognition in the form of non-transitory computer readable media, which has encoded thereon instructions for causing a processor to perform a method for processing documents which employs a smart optical character recognition trainer optimization process, a classifier algorithm and a property extraction process.

According to the present invention, the smart optical character recognition trainer optimization process uses extracted property values from both image output and textual output to perform classification based on a principal components analysis. The principal components analysis performs combinatorial scoring to aggregate values of analyses performed to sort a document into classes based on a combined score that is derived from multiple conditions determined through analysis. The classes include: (i) an extremely poor-quality document, in which analysis has measured that a document's quality is too low to be considered for automated trainer optimization, wherein a quality threshold for said document is so low that content may even be uninterpretable with human intervention; (ii) a low-quality document, in which analysis has measured that a document's quality can be improved or enhanced through automated optimization techniques, wherein a quality of a document in this threshold is also substandard to a predetermined acceptable threshold; and (iii) a high-quality document, in which analysis has measured that a document's quality now meets or exceeds said predetermined acceptable threshold.

The Smart Optical Character Recognition (SOCR) Trainer comprises software developed for automating Quality Control (QC) using unsupervised machine-learning techniques to analyze, classify, and optimize textual data extracted from an image or PDF document. SOCR Trainer serves as a 'data treatment' utility service that can be embedded into data processing workflows (e.g., data pipelines, ETL processes, data versioning repositories, etc.). SOCR Trainer performs a series of automated tests on the quality of images and their respective extracted textual data to determine if the extraction is trustworthy. If deficiencies are detected, SOCR Trainer will analyze certain parameters of the document, perform conditional optimizations, re-perform text extraction, and repeat QA testing until the output meets desired specifications. SOCR Trainer will produce audit files recording the provenance and differences between original documents and enhanced optimized document text.

According to one aspect of the present invention, an exemplary embodiment of an apparatus for converting imaged documents to electronic versions with encoded characters representing extracted textual data for subsequent processing comprises non-transitory computer readable media having encoded thereon instructions for causing a processor to perform several processes as explained below.

The processor creates an input queue for accepting the imaged documents. The input queue may be coupled to a data source or it may be part of a data migration ETL process. Alternatively, the input queue may be part of a data versioning repository's storage function, or as part of a data pipeline.

A page extract process is used to convert each page of an imaged document to a rasterized image.

An optical character recognition process: (i) extracts text from a PDF file; (ii) renders pages of a PDF document as images; and (iii) reads and modifies the properties of a PDF document; and (iv) builds a simple PDF viewer to perform special operations using PDF documents. The optical character recognition process produces as an output encoded textual characters that are machine-readable and can be utilized in word processing software.

An extraction process extracts quantitative values from each document. The extraction process includes several functional operations.

A noise detection and characterization functional operation is used to quantitatively characterize a degree to which each image is affected by noise.

A scanning-artifacts detection and characterization functional operation is used to quantitatively characterize a degree to which each image is affected by one or more known scanning artifacts.

A page alignment detection functional operation quantitatively characterizes a page alignment during which each document's page contents are geometrically partitioned into one or more page-segments having similar content.

An analyze sign and shape of textual characters functional operation quantitatively characterizes a size and shape for an entire distribution of characters in a document. For the entire distribution of characters in the document, a number of vertical pixels used to construct each character from top to bottom is determined, and a number of horizontal pixels used to construct each character from left-to-right is determined.

Four groups of characters are created based on a general style of representation because of their shared size and shapes. A first group consists of lower-case textual letters from the group consisting of: a, "c", "e", "m", "n", "o", "r", "s", "u", "v", "w", "x", and "z". A second group consists of lower-case textual letters from the group consisting of: "b", "d", "f", "g", "h", "l", "k", "p", "q", "t", and "y". A third group consists of all upper-case textual letters. A fourth group consists of Arabic numerals.

A statistical analysis of letter frequency functional operation is used to enumerate character frequency for each textual character identified in a document. Based on the subject matter of a document, preloaded dictionaries of domain-specific acronyms, abbreviations, and initialisms are employed to adjust for expected proportions of letter frequencies.

A letter placement and page alignment functional operation is used to: (i) detect a placement and composition of letter content; (ii) to determine page segmentation; and (iii) to detect a presence of white space between page segments and margins.

A typography analysis and detection functional operation is used to detect one or more typefaces used in a document. A context and dictionary-based spelling analysis functional operation is used to perform spelling analysis and enumerate an occurrence of misspelled words using common and domain-specific dictionaries to evaluate acceptability of words. Based on the subject matter of a document, one or more preloaded dictionaries of domain-specific acronyms, abbreviations, and initialisms are employed.

A classifier algorithm receives the quantitative values and performs classification employing a principal components analysis, which performs combinatorial scoring to aggregate the quantitative values to sort a document into classes based on a combined score that is derived from multiple conditions determined through analysis.

The classes include: (i) an extremely poor-quality document, in which analysis has measured that a document's quality is too low to be considered for automated trainer optimization, wherein a quality threshold for said document is so low that content may even be uninterpretable with human intervention; (ii) a low-quality document, in which analysis has measured that a document's quality can be improved or enhanced through automated optimization techniques, wherein a quality of a document in this threshold is also substandard to a predetermined acceptable threshold; (iii) a high-quality document, in which analysis has measured that a document's quality now meets or exceeds said predetermined acceptable threshold.

A suspense queue is created for storing extremely poor-quality documents deemed not appropriate for automated processing.

An output queue is populated with high quality documents determined to meet or exceed predetermined quality standards. These high quality documents include: (i) original high-quality documents; and (ii) derived high-quality documents. Each document includes files reporting on a chain-of-custody for audit purposes.

For original high-quality documents, these audit files include: (i) an unadulterated PDF document used as input; and (ii) a text file report stating one or more reasons the unadulterated PDF was deemed acceptable without further processing.

For derived high-quality documents, these audit files include: (i) an original unadulterated PDF document used as input; (ii) an enhanced PDF document resulting from optimization, which reflects changes in image and textual content; and (iii) a stylized HTML file report on one or more differences between said original document and said enhanced document, which stylized HTML file report includes a color-coded of each line of text that differs between said original unadulterated PDF document and said enhanced document highlighting any character differences existing in each line of text; and (iv) a similarity matrix graphically depicting a location of discovered differences throughout a document's content, which includes a jpg file representing a full context of a document with color symbology employed to show similarity between said original document and said enhanced document using colors where brightness indicates similarity and conversely darkness represents non-similarity.

An optimizer process receives the low quality documents and applies tailored optimization techniques based on the quantitative values extracted by the extraction process for each low quality document to improve its quality and to return low quality optimized documents to the extraction process for reprocessing.

According to another aspect of the present invention, an exemplary embodiment of an imaged document processing apparatus comprises a non-transitory computer readable media having encoded thereon instructions causing a processor to perform several processes, as explained below. An input queue is used for accepting imaged documents. An extraction process extracts quantitative values from each imaged document. A classifier algorithm receives the quantitative values and sorts each of the imaged documents into a class using the quantitative values. These classes include: (i) an extremely poor-quality document; (ii) a low-quality document; and (iii) a high-quality document. A suspense queue stores the extremely poor-quality documents for which it has been determined these extremely poor-quality documents are too extreme in poor quality for any additional automated processing. For each of the poor-quality documents two files are produced: (i) an original unadulterated PDF document; and (ii) a report stating one or more reasons for rejecting the extremely poor-quality document for further automated processing. An output queue is populated with high quality documents determined to meet or exceed predetermined quality standards. These documents include: (i) original high-quality documents; and (ii) derived high-quality documents. An optimizer process receives the low quality documents and selects and applies tailored optimization techniques based on the quantitative values extracted by the extraction process for each of the low quality documents to improve its quality and to return low quality optimized documents to the extraction process for reprocessing.

In this exemplary embodiment, the optimizer process may use weighted scores of the quantitative values for each of the low quality documents to determine which of optimization techniques to apply during the optimization process. These optimization techniques consist of: morphologic transformations, kernel filtering, masking, image enhancements, and noise reduction.

In this exemplary embodiment, the optimizer process may use the quantitative values extracted from both image and text to perform classification based on principal components analysis, in which combinatorial scoring is used to aggregate the quantitative values.

In this exemplary embodiment, each of the high quality documents include files reporting on a chain-of-custody for audit purposes. For original high-quality documents, these audit files include: (i) an unadulterated PDF document used as input; and (ii) a text file report stating why the unadulterated PDF was deemed acceptable without further processing. For the derived high-quality documents, these audit files include: (i) an original unadulterated PDF document used as input; (ii) an enhanced PDF document resulting from optimization, which reflects changes in image and textual content; and (iii) an audit report detailing one or more differences between said original document and said enhanced document, which audit report includes a color-code of each line of text that differs between said original unadulterated PDF document and said enhanced PDF document, and a highlight of character differences for each line of text; and (iv) a similarity matrix graphically depicting a location of discovered differences throughout a document's content. The similarity matrix includes a jpg file representing a full context of a document with color symbology employed to show similarity between said original unadulterated PDF document and said enhanced PDF document using colors where brightness indicates similarity and conversely darkness represents non-similarity.

In this exemplary embodiment, the input queue may be: (i) couplable to a data source; (ii) integrated into a data migration ETL process; (iii) integrated into a data versioning repository's storage function; or (iv) integrated into a data pipeline.

In this exemplary embodiment, the processor may create a page extract process to convert each page of an imaged document of the plurality of imaged documents to a rasterized image.

In this exemplary embodiment, the processor may create an optical character recognition process to create encoded textual characters from the plurality of imaged documents, wherein said encoded textual characters are machine-readable and can be utilized in word processing software.

In this exemplary embodiment, the processor may create an optical character recognition process to: (i) extract text from a PDF file; (ii) render pages of a PDF document as images; and (iii) read and modify the properties of a PDF document; and (iv) build a simple PDF viewer to perform special operations using PDF documents, wherein said optical character recognition process produces as an output encoded textual characters that are machine-readable and can be utilized in word processing software.

In this exemplary embodiment, the property extraction process may include a noise detection and characterization functional operation to quantitatively characterize a degree to which each image is affected by noise.

In this exemplary embodiment, the property extraction process may include a scanning-artifacts detection and characterization functional operation to quantitatively characterize a degree to which each image is affected by one or more known scanning artifacts.

In this exemplary embodiment, the property extraction process may include a page alignment detection functional operation to quantitatively characterize a page alignment during which each document's page contents are geometrically partitioned into one or more page-segments having similar content.

In this exemplary embodiment, the property extraction process may include an analyze sign and shape of textual characters functional operation to quantitatively characterize a size and shape for an entire distribution of characters in a document. For the entire distribution of characters in the document a number of vertical pixels used to construct each character from top to bottom may be determined and a number of horizontal pixels used to construct each character from left-to-right may be determined. At least four groups of characters may be created based on a general style of representation because of their shared size and shapes. A first group may consist of lower-case textual letters from the group consisting of: "a", "c", "e", "m", "n", "o", "r", "s", "u", "v", "w", "x", and "z". A second group may consist of lower-case textual letters from the group consisting of: "b", "d", "f", "g", "h", "l", "k", "p", "q", "t", and "y". A third group may consist of all upper-case textual letters. A fourth group may consist of Arabic numerals.

In this exemplary embodiment, the property extraction process may include a statistical analysis of letter frequency functional operation to enumerate character frequency for each textual character identified in a document, wherein based on a subject matter of a document, preloaded dictionaries of domain-specific acronyms, abbreviations, and initialisms are employed to adjust for expected proportions of letter frequencies.

In this exemplary embodiment, the property extraction process may include a letter placement and page alignment functional operation to: (i) detect a placement and composition of letter content; (ii) to determine page segmentation; and (iii) to detect a presence of white space between page segments and margins.

In this exemplary embodiment, the property extraction process may include a typography analysis and detection functional operation to detect one or more typefaces used in a document.

In this exemplary embodiment, the property extraction process may include a context and dictionary-based spelling analysis functional operation to perform spelling analysis and enumerate an occurrence of misspelled words using common and domain-specific dictionaries to evaluate acceptability of words, wherein based on a subject matter of a document, one or more preloaded dictionaries of domain-specific acronyms, abbreviations, and initialisms are employed.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 5 depicts examples of low-quality OCR which can be optimized using various aspects of present invention.

DETAILED DESCRIPTION

Figure 5:
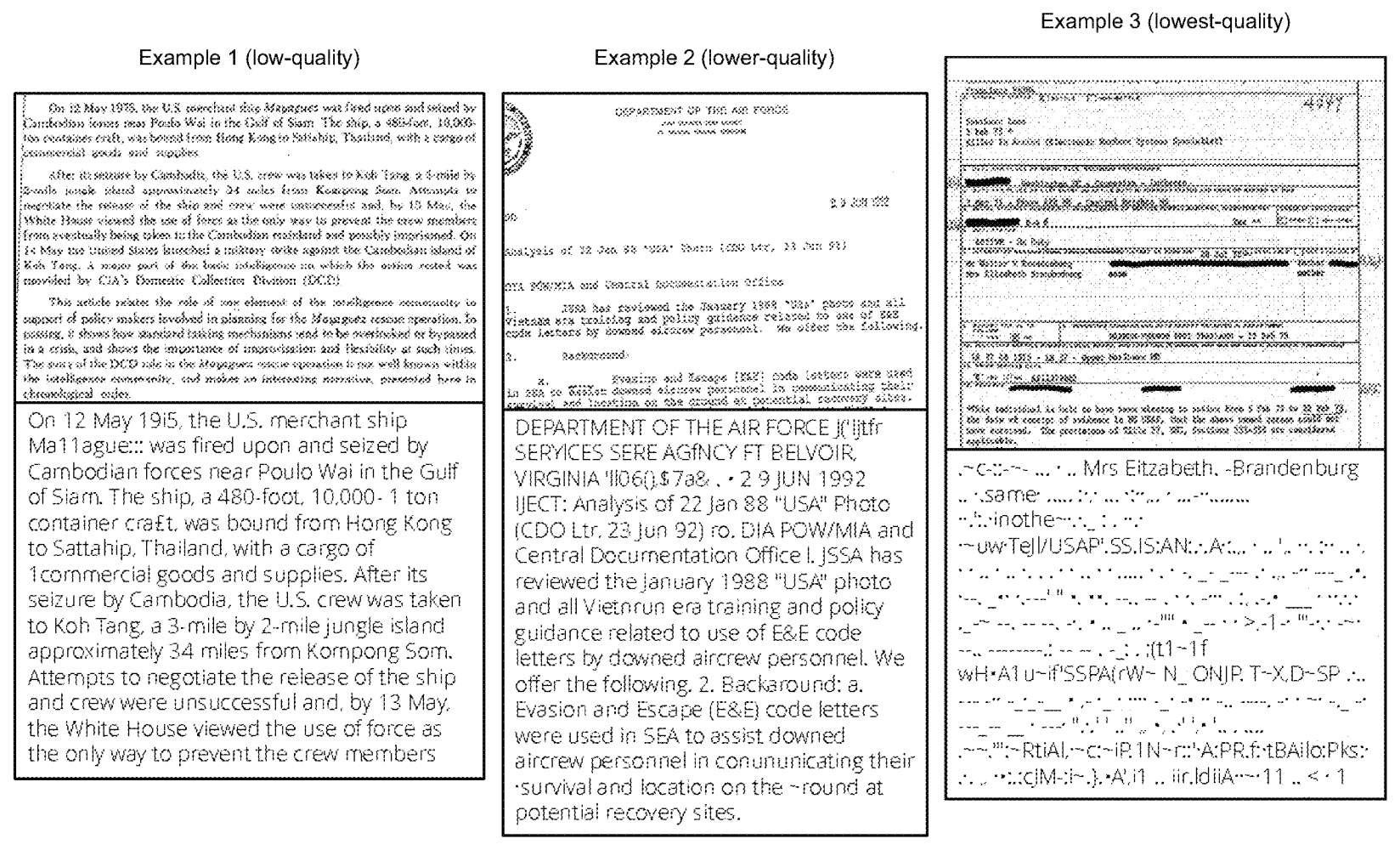

Turning to FIG. 5, depicted therein are examples of low-quality optical character recognition. Example 1 depicts a first low quality image, whereas Example 2 depicts a lower-quality image and finally Example 3 depicts a lowest quality image. These low-quality images can be optimized using the techniques of the present invention set forth herein.

Figure 6:
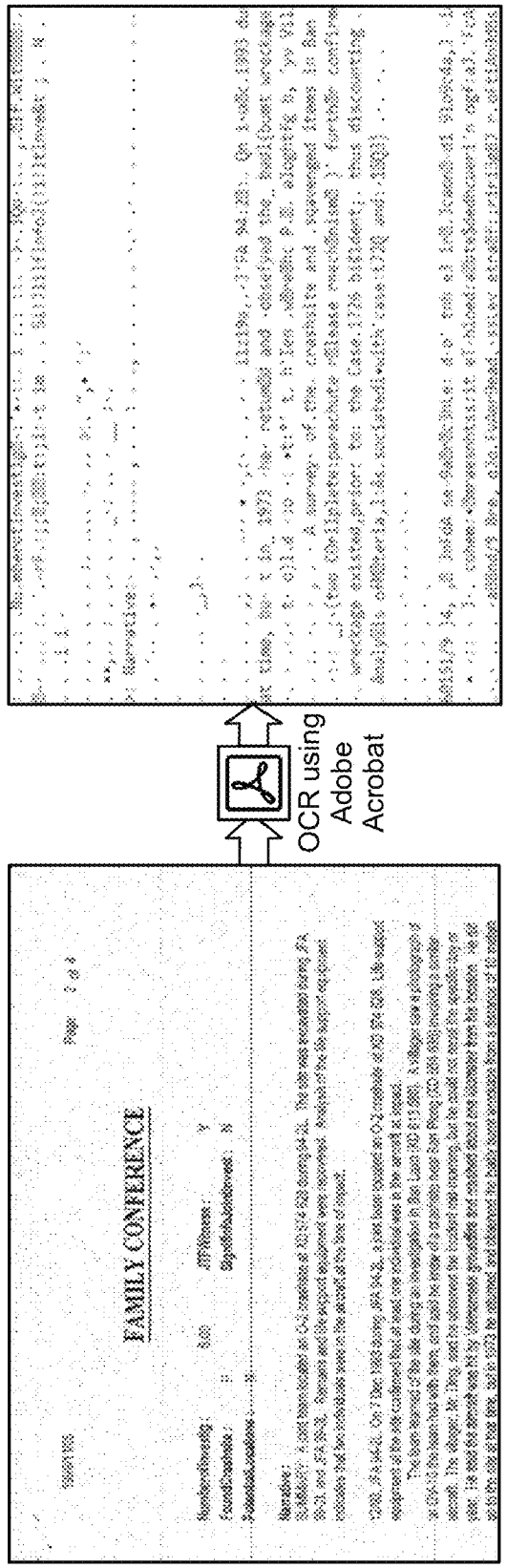
FIG. 6 depicts an example of suboptimal processing according to certain prior art techniques.

Turning to FIG. 6, this image shows the resulting processed images using existing suboptimal prior art workflow using Adobe Acrobat Pro optical character recognition. As evident from the right side of FIG. 6, the extracted text is of sufficiently poor quality that it is not useful for machine processing and would require human manual intervention to fix.

Figure 7:
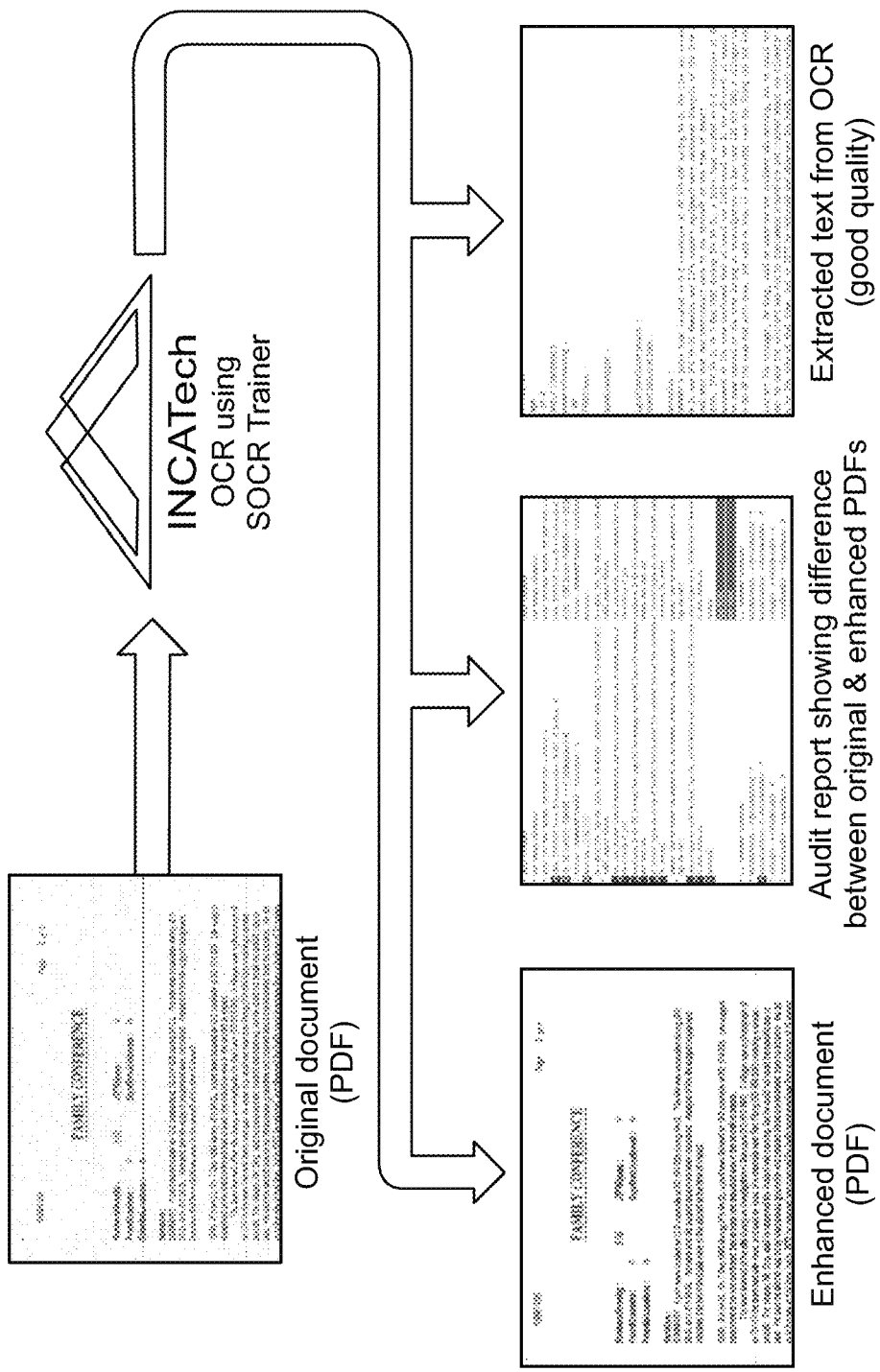
FIG. 7 depicts an example of the results of the optimal processing according to various aspect of the present invention.

Turning to FIG. 7, shown therein is the same original document used in FIG. 6 as processed by the techniques of the present invention. The output of the present invention is an enhanced document (far left image), an audit report showing the differences between the original and enhanced PDF (middle image) and extracted text from the optical character recognition of good quality (far right image). As evident from a comparison of the outputs of FIGS. 6 and 7, the processes of the present invention significantly improved the extracted text which is now of sufficiently good quality to be useful in machine processing.

Figure 1:
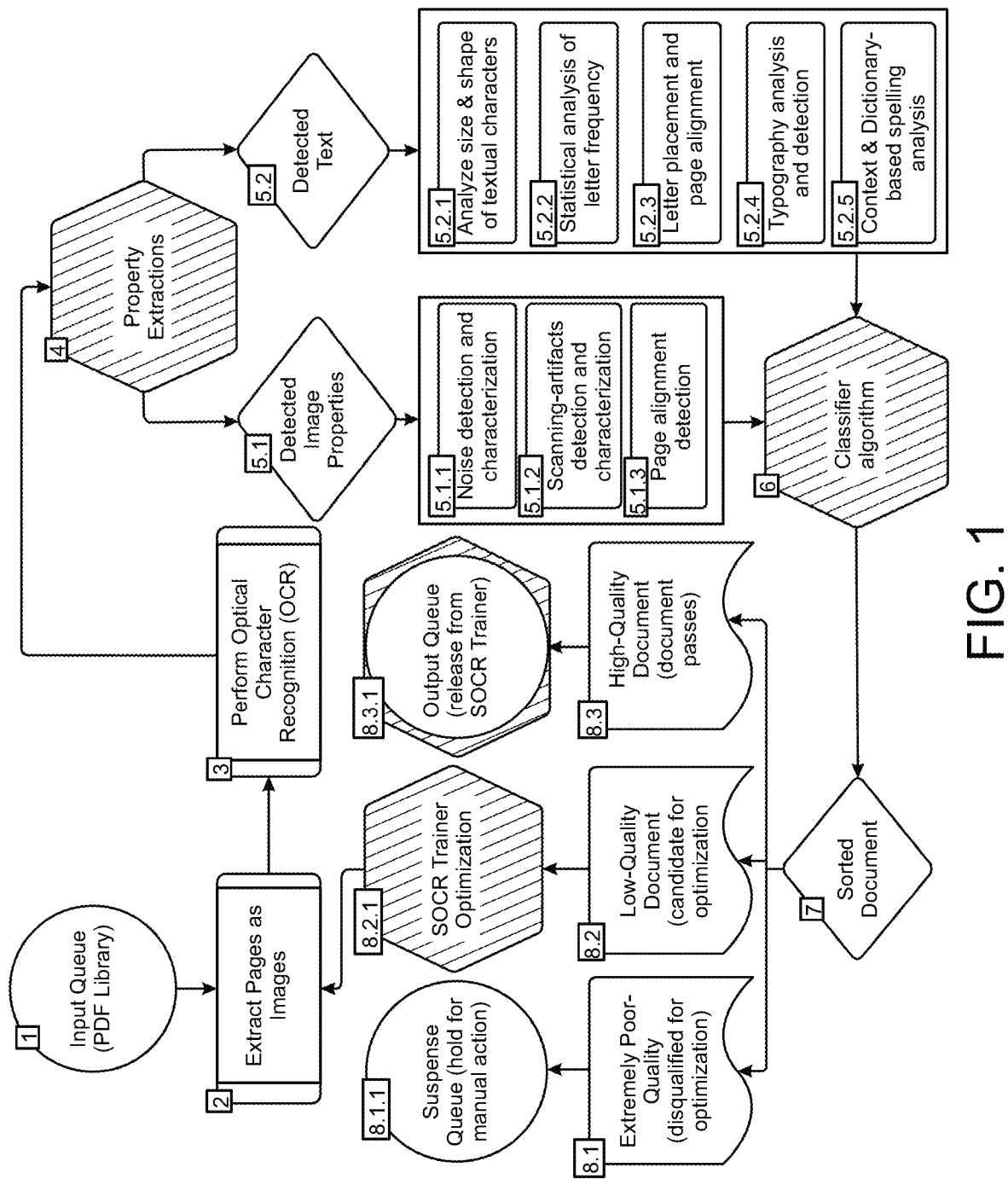
FIG. 1 depicts a step-by-step representation of an exemplary embodiment of the present invention for electronically processing images of documents according to one aspect of the present invention.

Turning to FIG. 1, this figure graphically describes a step-by-step representation of SOCR Trainer's components. Each step in the flow diagram is labeled with a number in its top-lefthand corner. Following the flow diagram, a detailed description for each step corresponding to its step label is provided.

1. Input Queue (Point of Termination)

The Input Queue 1 is the beginning stage of the SOCR Trainer flow. The input queue 1 can be populated by connecting directly to a data source, inserting SOCR Trainer into a data migration ETL process, as part of a data versioning repository's storage function, or as part of a data pipeline. The most common file type used is PDF, but SOCR Trainer can accept files in any document common image format (i.e., jpg, tif, png, etc.). If the file input is PDF, the intake for the Input Queue is a load operation performed using an open-source Python package "pdf2image" which converts PDF to a Python Imaging Library (PIL) Image object.

2. Extract Pages as Images (Predefined Process)

This predefined process is a necessary fixed step that converts each page of the PDF to a rasterized image using an open-source Python package "cv2" as part of the "OpenCV" open-source library.

3. Perform Optical Character Recognition [OCR] (Predefined Process)

This predefined process is a necessary fixed step that uses the Tesseract open-source library to perform optical character recognition (OCR) on each of the images produced at Step #2.This process uses the open-source Python package "pytesseract" which is an optical character recognition (OCR) tool for python that will recognize and read text embedded in images. This predefined process also uses Python Poppler as part of Tesseract to: 1) extract text from a PDF file; 2) render pages of a PDF document as images; 3) read and modify the properties of a PDF document; and 4) build a simple PDF viewer to perform special operations using PDF documents. The OCR performed in this step will produce encoded textual characters that are machine-readable and can be utilized in word processing software.

4. Property Extractions (Exemplary Embodiment)

Figure 2:
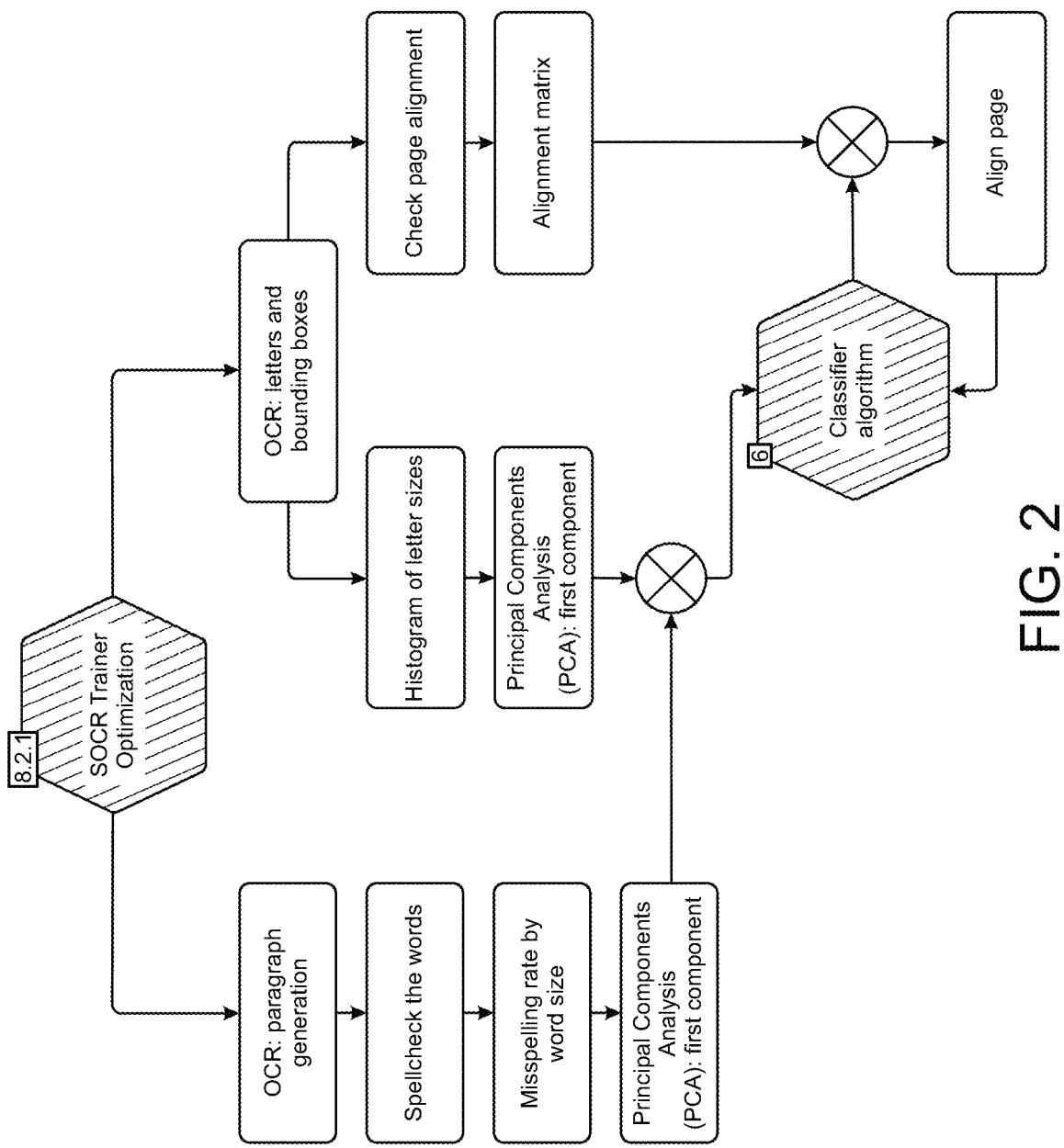
FIG. 2 depicts a diagram of the stepwise details of an exemplary embodiment of the present invention of property extractions according to another aspect of the present invention.

In this step, SOCR Trainer extracts the needed property values from the image output resulting from Step #2 for the series of analyses performed under Step #5.1.Correspondingly, this step also extracts the needed property values from the textual output resulting from Step #3 that are needed for the series of analyses performed under Step #5.2.A diagram depicting the stepwise details of property extractions is provided in FIG. 2.

Turning to FIG. 2, shown therein is a flow chart of the property extraction process of the present invention. Steps include the OCR: paragraph generation, followed by spellcheck of the words, and misspelling rate by word size. A principal components analysis (PCA) is then performed on these values and the first component is identified.

Additionally, the OCR: letters and bounding boxes is performed, after which a histogram of letter sizes is performed. Also, page alignment is checked followed by an alignment matrix calculation. Page alignment is performed. After which, the process flow returns to the classifier algorithm.

A PCA is performed on the histogram of letter sizes and the first component is identified. The outputs of the PCA are sent to the classifier algorithm.

5.1 Detected Image Properties (Output or Result)

The image properties that are derived from Step #4 are used to inform, or be used as input, for the following series of functional operations or analyses in Steps #5.1.1 to 5.1.3.

5.1.1 Noise Detection and Characterization (Functional Operation)

The purpose of this functional operation is to quantitatively characterize the degree to which the image is affected by noise (i.e., random variation of brightness or color information in images, and is usually an aspect of electronic noise). The output of this functional operation is used as a weighted score influencing SOCR Trainer's classifier algorithm at Step #6.

5.1.2 Scanning-Artifacts Detection and Characterization (Functional Operation)

The purpose of this functional operation is to quantitatively characterize the degree to which the image is affected by scanning artifacts that are usually caused by analog-to-digital converter errors, bit errors in transmission, etc. Common examples include manual redactions, dirt/smudge/ink blots, handwritten notes, etc. The output of this functional operation is used as a weighted score influencing SOCR Trainer's classifier algorithm at Step #6.

5.1.3 Page Alignment Detection (Functional Operation)

The purpose of this functional operation is to quantitatively characterize the page alignment (i.e., straightness of edges of margins of content in orientation to the edges of the image). Each document page's contents are geometrically partitioned into page-segments that have similar content (e.g., a paragraph, a table of data, a classification authority block, etc.). The output of this functional operation is used as a weighted score influencing SOCR Trainer's classifier algorithm at Step #6.

5.2 Detected Text (Output or Result)

The textual properties that are derived from Step #4 are used to inform, or be used as input, for the following series of functional operations or analyses in Steps #5.2.1 to 5.2.5.

5.2.1 Analyze Size & Shape of Textual Characters (Functional Operation)

The purpose of this functional operation is to quantitatively characterize the size (i.e., the number of vertical pixels used to construct a character from top-to-bottom) and shape (i.e., the number of horizontal pixels used to construct a character from left-to-right) for the entire distribution of characters in a document. While typeface and font can introduce variation in size and shape of characters, SOCR Trainer will create four groups of characters based on the general style of representation because of their shared size & shapes:

Group 1: Consists of the lower-case textual letters: "a", "c", "m", "n", "o", "r", "s", "u", "v", "w", "x", "z"
Group 2: Consists of lower-case textual letters: "b", "d", "f", "g", "h", "I", "k", "p", "q", "t", "y"
Group 3: Consists of all upper-case textual letters
Group 4: Consists of Arabic numerals (i.e., numerical digits "0", "1", "2", "3", "4" "5", "6", "7", "8" and "9")

The output of this functional operation is used as a weighted score influencing SOCR Trainer's classifier algorithm at Step #6.

5.2.2 Statistical Analysis of Letter Frequency (Functional Operation)

The purpose of this functional operation is to enumerate the occurrence for each textual character found in a document. The number of found occurrences for each character are referred to as the "character frequency" for each character. This frequency analysis is based on the fact that, in any given stretch of written language, certain letters and combinations of letters occur with varying frequencies. Moreover, there is a characteristic distribution of letters that is roughly the same for almost all samples of that language. For instance, given a section of English language the letters "E", "T", "A" and "O" are the most frequent. Conversely the letters "Z", "Q", "X" and "J" are the most infrequent. Based on the subject matter of a document, SOCR Trainer may use preloaded dictionaries of domain-specific acronyms, abbreviations, and initialisms to help adjust for expected proportions of letter frequencies. The output of this functional operation is used as a weighted score influencing SOCR Trainer's classifier algorithm at Step #6.

5.2.3 Letter Placement and Page Alignment (Functional Operation)

The purpose of this functional operation is to detect the placement and composition of letter content, determine page segmentation, and the presence of white space between page segments and margins. The presence or absence of white space can impact the effectiveness of certain types of computer vision analysis and optimization techniques. The output of this functional operation is used as a weighted score influencing SOCR Trainer's classifier algorithm at Step #6.

5.2.4 Typography Analysis and Detection (Functional Operation)

The purpose of this functional operation is to detect the typeface(s) used in a document. A known typeface can be helpful as many typefaces and fonts share common traits that are associated with how the quality of a document may be enhanced through noise reduction and image optimization. The output of this functional operation is used as a weighted score influencing SOCR Trainer's classifier algorithm at Step #6.

5.2.5 Context and Dictionary-Based Spelling Analysis (Functional Operation)

The purpose of this functional operation is to perform spelling analysis and enumerate the occurrence of misspelled words using common and domain-specific dictionaries to evaluate the acceptability of words. Based on the subject matter of a document, SOCR Trainer may use preloaded dictionaries of domain-specific acronyms, abbreviations, and initialisms to assist in this operation. The output of this functional operation is used as a weighted score influencing SOCR Trainer's classifier algorithm at Step #6.

6. Classifier Algorithm (Exemplary Embodiment)

In this step, SOCR Trainer uses the extracted property values from both image output and textual output (i.e., preceding weighted scores derived from the series of analyses described under Steps #5.1 and #5.2) to perform classification using an invented method based on Principal Components Analysis (PCA). The multi-layer invented method performs combinatorial scoring to aggregate the values of analyses performed. The objective of this PCA classification is to sort the document into one of the following classes based on a combined score that is derived from multiple conditions determined through analysis.

(Class 1) Extremely Poor-Quality Document: Analysis has measured that the document's quality is too low to be considered for automated SOCR Trainer optimization. The quality threshold for Class 1 documents is so low that often content may even be uninterpretable with human intervention.

(Class 2) Low-Quality Document: Analysis has measured that the document's quality can be improved or enhanced through automated SOCR Trainer optimization techniques. The quality of the document is also substandard to the specified acceptable threshold.

(Class 3) High-Quality Document: Analysis has measured that the document's quality now meets or exceeds the specified acceptable threshold.

Figure 3:
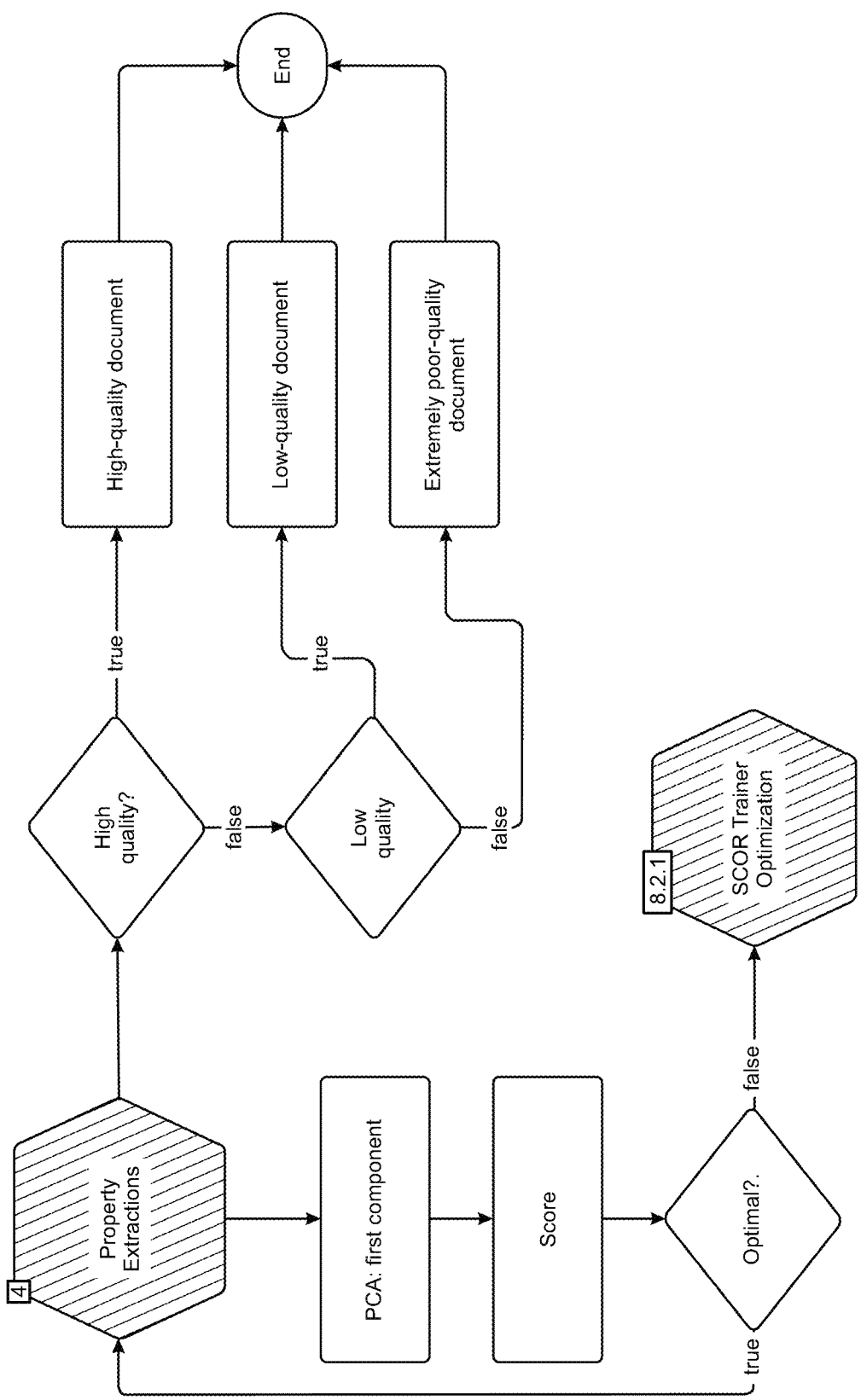
FIG. 3 depicts the stepwise details of an exemplary embodiment of the present invention of a classifier algorithm according to yet another aspect of the present invention.

Turning to FIG. 3, a diagram depicting the stepwise details of SOCR Trainer's classifier algorithm is provided therein. A PCA is performed on the output of the property extractions. The score is determined and checked to determine if optimal. If not optimal, the document is sent to the SOCR trainer optimization process. If optimal, the process returns to the property extractions process, which checks if the document is high quality or not. If high quality, the document is labelled a high-quality document and processed as explained below. If not, a second test is performed to determine whether the document is low quality or not. If not, the document is determined to be an extremely poor-quality document and processed as explained below. If it is determined the document is a low-quality document, the document is processed as explained below.

7. Sorted Document (Output or Result)

The document that has successfully been sorted using the Classifier algorithm described in preceding Step #6.

8.1 Extremely Poor-Quality [Disqualified for Optimization] (Document)

Through analysis, these documents have been determined to be in a state of extremely poor-quality that they do not possess intelligible properties that SOCR can use for optimization. There are multiple factors that can be attributed to this type of document, but some common factors are:

Extremely high noise-to-signal ratio (e.g., resolution so unclear that text cannot be discerned Original digitized text is too small spatial resolution (e.g., too few pixels used for each letter)

Obstruction of content (e.g., content cannot be logically located, and the only textual characters are being derived from noise)

8.1.1 Suspense Queue [Hold for Manual Action] (Point of Termination)

The Suspense Queue is one of the two ending stages of the SOCR Trainer flow (the other is the Output Queue described below in Step #8.3.1). The Suspense Queue is populated with documents that have been determined too extreme in poor-quality for any additional automated action. Two files are produced for every document in the Suspense Queue:

1. File 1 (Document file): The original unadulterated PDF document that was used as input for SOCR Trainer at Step #1.
2. File 2 (Reason report file): This text file consists of a report stating the reason(s) identified to reject the original PDF document from further SOCR Trainer action.

8.2 Low-Quality Document [Candidate for Optimization] (Document)

Through analysis, these documents have been found to be in a state of poor-quality but qualify for processing with SOCR Trainer optimization techniques. They have been determined to have all necessary properties and prerequisites for processing.

8.2.1 SOCR Trainer Optimization (Exemplary Embodiment)

At this stage, SOCR Trainer will perform invented optimization methods based on techniques to resolve document issues identified in the series of analyses described under Steps #5.1 and #5.2. Through analysis and study, different optimization techniques using different degrees of intensity can be both helpful and harmful depending on a document's unique conditions. Therefore, SOCR Trainer uses preceding weighted scores to apply tailored optimization techniques (e.g., morphologic transformations, kernel filtering, masking, image enhancements, noise reduction, etc.) that are selected based on a document's properties.

Figure 4:
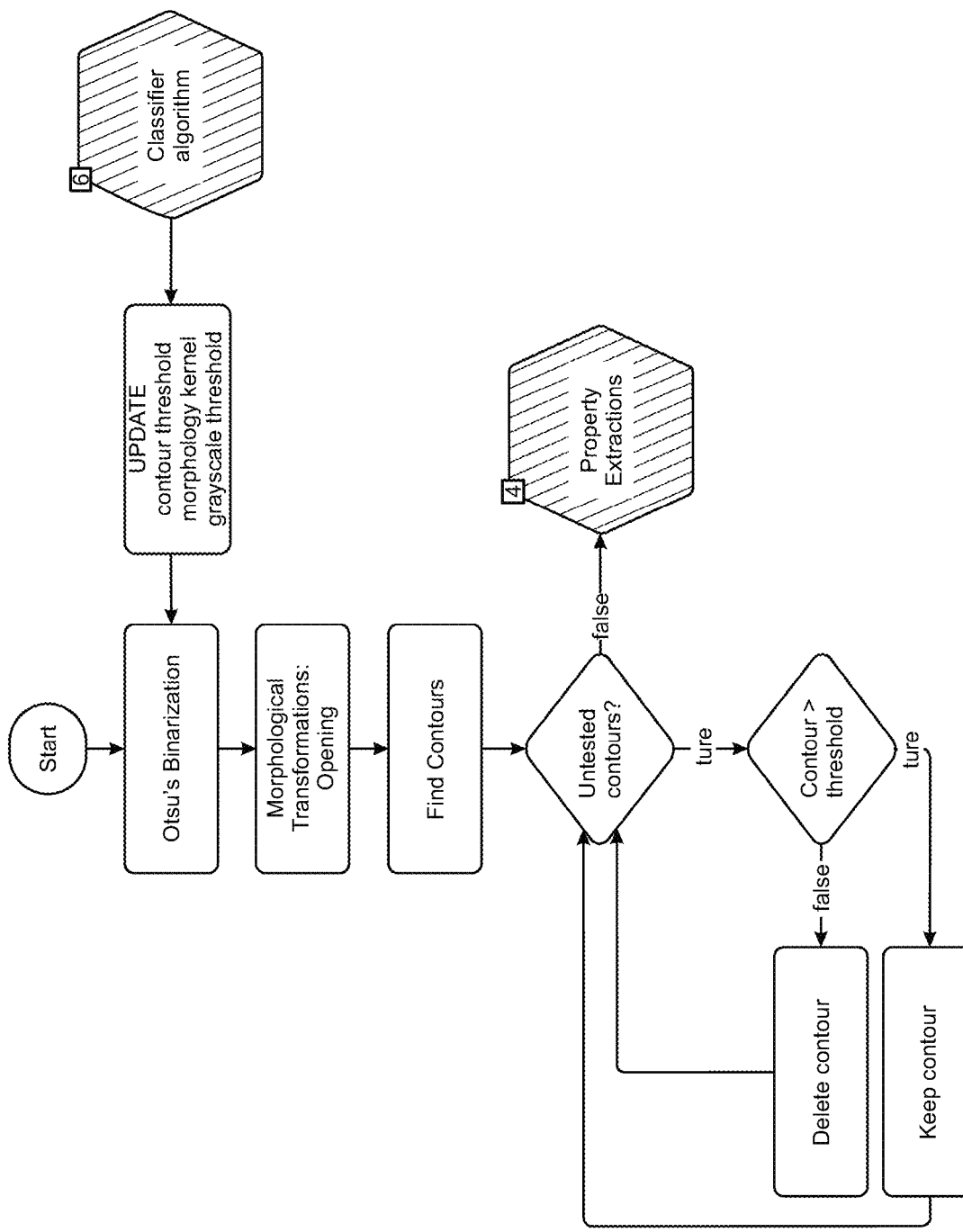
FIG. 4 depicts the stepwise details of an exemplary embodiment of the present invention of an optimization algorithm according to still another aspect of the present invention.

Once optimization is completed, the document will then be cycled through SOCR Trainer starting at Step #2 and repeat processing until a termination point is reached. A diagram depicting the stepwise details of SOCR Trainer's optimization algorithm is provided in FIG. 4.

The process begins with Otsu's binarization, which receives input from the classifier algorithm and an update of contour threshold morphology, kernel grayscale threshold. A morphological transformation: opening is performed. Contours are found. If there are untested contours a contour threshold is checked and if above the contour threshold, the contour is kept. If not, the contour is deleted and both processes return to checking for untested contours. If there are no untested contours, then the process returns to the property extraction process.

8.3 High-Quality Document [Document Passes] (Document)

Through analysis, these documents have been determined to be in a state of high-quality and no longer require any additional action from SOCR Trainer because the standard of acceptance has been met. Documents populating this queue have arrived from one of two procedures:

1. Original high-quality documents: Documents that have not undergone any alterations from its original state (i.e., no actions from SOCR Trainer were required after successfully proceeding from Step #1 through Step #7 described above).
2. Derived high-quality documents: Documents that have been improved or enhanced using SOCR Trainer's optimization techniques. These documents have been processed through SOCR Trainer's Steps #1 through Step 8.2.1 one or more times and consists of textual content that differs from the original unadulterated document.

8.3.1 Output Queue [Release from SOCR Trainer] (Point of Termination)

The Output Queue is one of the two ending stages of the SOCR Trainer flow (the other is the Suspense Queue described above in Step #8.1.1). The Output Queue is populated with documents that have been determined to meet or exceed the quality standards specified by the SOCR Trainer user. As stated above in Step #8.3, there are two types of documents that qualify to populate the Output queue, 1) Original high-quality documents and 2) Derived high-quality documents. Each of these document types will have files reporting on the chain-of-custody for audit purposes; the description below provides details for files produced respective to the process that took place on the document:

1. Original high-quality documents: For this type of document, the following files are produced:
   File 1 (Document file): The original unadulterated PDF document that was used as input for SOCR Trainer at Step #1.
   File 2 (Reason report file): This text file consists of a report stating the reason(s) identified to accept the original PDF document with no further SOCR Trainer action needed.
2. Derived high-quality documents: For this type of document, the following files are produced:
   File 1 (Document file): The original unadulterated PDF document that was used as input for SOCR Trainer at Step #1.
   File 2 (Enhanced document file): The enhanced PDF document resulting from SOCR Trainer optimization techniques. This version of the document will reflect changes in image and textual content.
   File 3 (Audit report file): This stylized HTML file reports on the differences between the original document (file 1) and the enhanced document (file 2). The Audit report will color-code each line of text that differs between files 1 & 2 and highlight what character differences there are for each line of text.
   File 4 (Similarity matrix): The similarity matrix graphically depicts the location of found differences throughout a document's content. The file output is a jpg representing the full context of a document and uses color symbology to show similarity between the original document (file 1) and the enhanced document (file 2) using colors where brightness indicates similarity and conversely darkness represents non-similarity. The similarity matrix can be used as an analytical tool to help model the relationship between original and enhanced documents and is also useful as a decision-making aid to help craft the page segmentation for enhanced documents.

What is claimed is:

1. An apparatus for converting one or more imaged documents to one or more electronic versions of the imaged documents including encoded characters representing extracted textual data for subsequent processing comprising non-transitory computer readable media having encoded thereon a plurality of instructions for causing a processor to perform a plurality of processes including:
   an input queue for accepting said plurality of imaged documents, said input queue to be coupled to a data source, a data migration ETL process, as part of a data versioning repository's storage function, or as part of a data pipeline;
   a page extract process to convert each page of an imaged document of the plurality of imaged documents to a rasterized image;
   an optical character recognition process to: (i) extract text from a PDF file; (ii) render pages of a PDF document as images; and (iii) read and modify the properties of a PDF document; and (iv) build a simple PDF viewer to perform special operations using PDF documents, wherein said optical character recognition process produces as an output encoded textual characters that are machine-readable and can be utilized in word processing software;
   an extraction process to extract a plurality of quantitative values from each document, said extraction process including:
      a noise detection and characterization functional operation to quantitatively characterize a degree to which each image is affected by noise;
      a scanning-artifacts detection and characterization functional operation to quantitatively characterize a degree to which each image is affected by one or more known scanning artifacts;
      a page alignment detection functional operation to quantitatively characterize a page alignment during which each document's page contents are geometrically partitioned into one or more page-segments having similar content;
      an analyze sign and shape of textual characters functional operation to quantitatively characterize a size and shape for an entire distribution of characters in a document, wherein for said entire distribution of characters in the document a number of vertical pixels used to construct each character from top to bottom is determined and a number of horizontal pixels used to construct each character from left-to-right is determined, and four groups of characters are created based on a general style of representation because of their shared size and shapes;
      wherein:
         a first group consists of lower-case textual letters from the group consisting of: "a", "c", "e", "m", "n", "o", "r", "s", "u", "v", "w", "x", and "z";
         a second group consists of lower-case textual letters from the group consisting of: "b", "d", "f", "g", "h", "l", "k", "p", "q", "t", and "y";
         a third group consists of all upper-case textual letters; and
         a fourth group consists of Arabic numerals;
      a statistical analysis of letter frequency functional operation to enumerate character frequency for each textual character identified in a document, wherein based on a subject matter of a document, preloaded dictionaries of domain-specific acronyms, abbreviations, and initialisms are employed to adjust for expected proportions of letter frequencies;
      a letter placement and page alignment functional operation to: (i) detect a placement and composition of letter content; (ii) to determine page segmentation; and (iii) to detect a presence of white space between page segments and margins;
      a typography analysis and detection functional operation to detect one or more typefaces used in a document;
      a context and dictionary-based spelling analysis functional operation to perform spelling analysis and enumerate an occurrence of misspelled words using common and domain-specific dictionaries to evaluate acceptability of words, wherein based on a subject matter of a document, one or more preloaded dictionaries of domain-specific acronyms, abbreviations, and initialisms are employed;
   a classifier algorithm to receive said plurality of quantitative values to perform classification employing a principal components analysis, which performs combinatorial scoring to aggregate the plurality of quantitative values to sort a document into one of a plurality of classes based on a combined score that is derived from multiple conditions determined through analysis, said plurality of classes including:
(i) an extremely poor-quality document, in which analysis has measured that a document's quality is too low to be considered for automated trainer optimization, wherein a quality threshold for said document is so low that content may even be uninterpretable with human intervention;
(ii) a low-quality document, in which analysis has measured that a document's quality can be improved or enhanced through automated optimization techniques, wherein a quality of a document in this threshold is also substandard to a predetermined acceptable threshold;
(iii) a high-quality document, in which analysis has measured that a document's quality now meets or exceeds said predetermined acceptable threshold; and
a suspense queue for storing a plurality of extremely poor-quality documents deemed not appropriate for automated processing;
an output queue populated with a plurality of high quality documents determined to meet or exceed said predetermined quality standards, said plurality of high quality documents including: (i) original high-quality documents; and (ii) derived high-quality documents;
wherein each of said documents include one or more files reporting on a chain-of-custody for audit purposes;
wherein for said original high-quality documents, said one or more files include: (i) an unadulterated PDF document used as input; and (ii) a text file report stating one or more reasons the unadulterated PDF was deemed acceptable without further processing;
wherein for said derived high-quality documents, said one or more file include: (i) an original unadulterated PDF document used as input; (ii) an enhanced PDF document resulting from optimization, which reflects changes in image and textual content; and (iii) a stylized HTML file report on one or more differences between said original document and said enhanced document, which stylized HTML file report includes a color-coded of each line of text that differs between said original unadulterated PDF document and said enhanced document highlighting any character differences existing in each line of text; and (iv) a similarity matrix graphically depicting a location of discovered differences throughout a document's content, which includes a jpg file representing a full context of a document with color symbology employed to show similarity between said original document and said enhanced document using colors where brightness indicates similarity and conversely darkness represents non-similarity; and
an optimizer process to receive the plurality of low quality documents and to apply one or more tailored optimization techniques based on the plurality of quantitative values extracted by the extraction process for each of the plurality of low quality documents to improve a quality of said low quality documents and to return a plurality of low quality optimized documents to the extraction process for reprocessing.

2. The apparatus according to claim 1, wherein said optimizer process uses a plurality of weighted scores of the plurality of quantitative values for each of the plurality of low quality documents to determine which of one or more optimization techniques to apply during the optimization process, wherein said one or more optimization techniques consist of: morphologic transformations, kernel filtering, masking, image enhancements, and noise reduction.

3. The apparatus according to claim 1, wherein the optimization process uses the plurality of quantitative values extracted from both image and text to perform classification based on principal components analysis, in which combinatorial scoring is used to aggregate the plurality of quantitative values.

4. An imaged document processing apparatus comprising a non-transitory computer readable media having encoded thereon a plurality of instructions causing a processor to perform:
an input queue for accepting a plurality of imaged documents;
an extraction process to extract a plurality of quantitative values from each of said plurality of imaged documents; and
a classifier algorithm to receive said plurality of quantitative values to sort each of the plurality of imaged document into one of a plurality of classes using the plurality of quantitative values, said plurality of classes including: (i) an extremely poor-quality document; (ii) a low-quality document; and (iii) a high-quality document;
a suspense queue for storing said plurality of extremely poor-quality documents for which it has been determined said plurality of extremely poor-quality documents are too extreme in poor quality for any additional automated processing, wherein for each of the plurality extremely poor-quality documents two files are produced: (i) an original unadulterated PDF document; and (ii) a report stating one or more reasons for rejecting said each of the plurality of extremely poor-quality documents for further automated processing;
an output queue populated with said plurality of high quality documents determined to meet or exceed predetermined quality standards, said plurality of documents including: (i) a plurality of original high-quality documents; and (ii) a plurality of derived high-quality documents; and
an optimizer process to receive the plurality of low quality documents and to select and apply one or more tailored optimization techniques based on the plurality of quantitative values extracted by the extraction process for each of the plurality of low quality documents to improve a quality of said low quality documents and to return a plurality of low quality optimized documents to the extraction process for reprocessing, wherein:
each of said plurality of high quality documents include one or more files reporting on a chain-of-custody for audit purposes;
for said plurality of original high-quality documents, said one or more files include: (i) an unadulterated PDF document used as input; and (ii) a text file report stating one or more reasons the unadulterated PDF was deemed acceptable without further processing; and
for said plurality of derived high-quality documents, said one or more files include: (i) an original unadulterated PDF document used as input; (ii) an enhanced PDF document resulting from optimization, which reflects changes in image and textual content; and (iii) an audit report detailing one or more differences between said original document and said enhanced document, which audit report includes a color-code of each line of text that differs between said original unadulterated PDF document and said enhanced PDF document, and a highlight of character differences for each line of text.

5. The apparatus according to claim 4, wherein for said plurality of derived high-quality documents, said one or more files further include:
- a similarity matrix graphically depicting a location of discovered differences throughout a document's content;
- wherein said similarity matrix includes a jpg file representing a full context of a document with color symbology employed to show similarity between said original unadulterated PDF document and said enhanced PDF document using colors where brightness indicates similarity and conversely darkness represents non-similarity.

6. The apparatus according to claim 4, wherein said input queue: (i) is couplable to a data source; (ii) is integrated into a data migration ETL process; (iii) integrated into a data versioning repository's storage function; or (iv) integrated into a data pipeline.

7. The apparatus according to claim 4, wherein the plurality of instructions further cause the processor to perform:
- a page extract process to convert each page of an imaged document of the plurality of imaged documents to a rasterized image.

8. The apparatus according to claim 4, wherein the plurality of instructions further cause the processor to perform:
- an optical character recognition process to create encoded textual characters from the plurality of imaged documents, wherein said encoded textual characters are machine-readable and can be utilized in word processing software.

9. An imaged document processing apparatus comprising a non-transitory computer readable media having encoded thereon a plurality of instructions causing a processor to perform:
- an input queue for accepting a plurality of imaged documents;
- an extraction process to extract a plurality of quantitative values from each of said plurality of imaged documents; and
- a classifier algorithm to receive said plurality of quantitative values to sort each of the plurality of imaged document into one of a plurality of classes using the plurality of quantitative values, said plurality of classes including: (i) an extremely poor-quality document; (ii) a low-quality document; and (iii) a high-quality document;
- a suspense queue for storing said plurality of extremely poor-quality documents for which it has been determined said plurality of extremely poor-quality documents are too extreme in poor quality for any additional automated processing, wherein for each of the plurality extremely poor-quality documents two files are produced: (i) an original unadulterated PDF document; and (ii) a report stating one or more reasons for rejecting said each of the plurality of extremely poor-quality documents for further automated processing;
- an output queue populated with said plurality of high quality documents determined to meet or exceed predetermined quality standards, said plurality of documents including: (i) a plurality of original high-quality documents; and (ii) a plurality of derived high-quality documents; and
- an optimizer process to receive the plurality of low quality documents and to select and apply one or more tailored optimization techniques based on the plurality of quantitative values extracted by the extraction process for each of the plurality of low quality documents to improve a quality of said low quality documents and to return a plurality of low quality optimized documents to the extraction process for reprocessing, wherein the plurality of instructions further cause the processor to perform:
- an optical character recognition process to: (i) extract text from a PDF file; (ii) render pages of a PDF document as images; and (iii) read and modify the properties of a PDF document; and (iv) build a simple PDF viewer to perform special operations using PDF documents, wherein said optical character recognition process produces as an output encoded textual characters that are machine-readable and can be utilized in word processing software.

10. The apparatus according to claim 9, wherein said property extraction process includes:
- a noise detection and characterization functional operation to quantitatively characterize a degree to which each image is affected by noise.

11. The apparatus according to claim 9, wherein said property extraction process includes:
- a scanning-artifacts detection and characterization functional operation to quantitatively characterize a degree to which each image is affected by one or more known scanning artifacts.

12. The apparatus according to claim 9, wherein said property extraction process includes:
- a page alignment detection functional operation to quantitatively characterize a page alignment during which each document's page contents are geometrically partitioned into one or more page-segments having similar content.

13. The apparatus according to claim 9, wherein said property extraction process includes:
- an analyze sign and shape of textual characters functional operation to quantitatively characterize a size and shape for an entire distribution of characters in a document.

14. An imaged document processing apparatus comprising a non-transitory computer readable media having encoded thereon a plurality of instructions causing a processor to perform:
- an input queue for accepting a plurality of imaged documents;
- an extraction process to extract a plurality of quantitative values from each of said plurality of imaged documents; and
- a classifier algorithm to receive said plurality of quantitative values to sort each of the plurality of imaged document into one of a plurality of classes using the plurality of quantitative values, said plurality of classes including: (i) an extremely poor-quality document; (ii) a low-quality document; and (iii) a high-quality document;
- a suspense queue for storing said plurality of extremely poor-quality documents for which it has been determined said plurality of extremely poor-quality documents are too extreme in poor quality for any additional automated processing, wherein for each of the plurality extremely poor-quality documents two files are produced: (i) an original unadulterated PDF document; and (ii) a report stating one or more reasons for rejecting said each of the plurality of extremely poor-quality documents for further automated processing;
- an output queue populated with said plurality of high quality documents determined to meet or exceed predetermined quality standards, said plurality of documents including: (i) a plurality of original high-quality documents; and (ii) a plurality of derived high-quality documents; and an optimizer process to receive the plurality of low quality documents and to select and apply one or more tailored optimization techniques based on the plurality of quantitative values extracted by the extraction process for each of the plurality of low quality documents to improve a quality of said low quality documents and to return a plurality of low quality optimized documents to the extraction process for reprocessing, wherein said property extraction process includes:

an analyze sign and shape of textual characters functional operation to quantitatively characterize a size and shape for an entire distribution of characters in a document, wherein for said entire distribution of characters in the document a number of vertical pixels used to construct each character from top to bottom is determined and a number of horizontal pixels used to construct each character form left-to-right is determined.

15. An imaged document processing apparatus comprising a non-transitory computer readable media having encoded thereon a plurality of instructions causing a processor to perform:

an input queue for accepting a plurality of imaged documents;

an extraction process to extract a plurality of quantitative values from each of said plurality of imaged documents; and a classifier algorithm to receive said plurality of quantitative values to sort each of the plurality of imaged document into one of a plurality of classes using the plurality of quantitative values, said plurality of classes including: (i) an extremely poor-quality document; (ii) a low-quality document; and (iii) a high-quality document;

a suspense queue for storing said plurality of extremely poor-quality documents for which it has been determined said plurality of extremely poor-quality documents are too extreme in poor quality for any additional automated processing, wherein for each of the plurality extremely poor-quality documents two files are produced: (i) an original unadulterated PDF document; and (ii) a report stating one or more reasons for rejecting said each of the plurality of extremely poor-quality documents for further automated processing;

an output queue populated with said plurality of high quality documents determined to meet or exceed predetermined quality standards, said plurality of documents including: (i) a plurality of original high-quality documents; and (ii) a plurality of derived high-quality documents; and an optimizer process to receive the plurality of low quality documents and to select and apply one or more tailored optimization techniques based on the plurality of quantitative values extracted by the extraction process for each of the plurality of low quality documents to improve a quality of said low quality documents and to return a plurality of low quality optimized documents to the extraction process for reprocessing, wherein said property extraction process includes:

an analyze sign and shape of textual characters functional operation to quantitatively characterize a size and shape for an entire distribution of characters in a document, wherein:

at least four groups of characters are created based on a general style of representation because of their shared size and shapes;

a first group of the at least four groups consists of lower-case textual letters from the group consisting of: "a", "c", "e", "m", "n", "o", "r", "s", "u", "v", "w", "x", and "z";

a second group of the at least four groups consists of lower-case textual letters from the group consisting of: "b", "d", "f", "g", "h", "l", "k", "p", "q", "t", and "y";

a third group of the at least four groups consists of all upper-case textual letters; and a fourth group of the at least four groups consists of Arabic numerals.

16. An imaged document processing apparatus comprising a non-transitory computer readable media having encoded thereon a plurality of instructions causing a processor to perform:

an input queue for accepting a plurality of imaged documents;

an extraction process to extract a plurality of quantitative values from each of said plurality of imaged documents; and a classifier algorithm to receive said plurality of quantitative values to sort each of the plurality of imaged document into one of a plurality of classes using the plurality of quantitative values, said plurality of classes including: (i) an extremely poor-quality document; (ii) a low-quality document; and (iii) a high-quality document;

a suspense queue for storing said plurality of extremely poor-quality documents for which it has been determined said plurality of extremely poor-quality documents are too extreme in poor quality for any additional automated processing, wherein for each of the plurality extremely poor-quality documents two files are produced: (i) an original unadulterated PDF document; and (ii) a report stating one or more reasons for rejecting said each of the plurality of extremely poor-quality documents for further automated processing;

an output queue populated with said plurality of high quality documents determined to meet or exceed predetermined quality standards, said plurality of documents including: (i) a plurality of original high-quality documents; and (ii) a plurality of derived high-quality documents; and an optimizer process to receive the plurality of low quality documents and to select and apply one or more tailored optimization techniques based on the plurality of quantitative values extracted by the extraction process for each of the plurality of low quality documents to improve a quality of said low quality documents and to return a plurality of low quality optimized documents to the extraction process for reprocessing, wherein said property extraction process includes:

a statistical analysis of letter frequency functional operation to enumerate character frequency for each textual character identified in a document, wherein based on a subject matter of a document, preloaded dictionaries of domain-specific acronyms, abbreviations, and initialisms are employed to adjust for expected proportions of letter frequencies.

17. An imaged document processing apparatus comprising a non-transitory computer readable media having encoded thereon a plurality of instructions causing a processor to perform:

an input queue for accepting a plurality of imaged documents;

an extraction process to extract a plurality of quantitative values from each of said plurality of imaged documents; and a classifier algorithm to receive said plurality of quantitative values to sort each of the plurality of imaged document into one of a plurality of classes using the plurality of quantitative values, said plurality of classes including: (i) an extremely poor-quality document; (ii) a low-quality document; and (iii) a high-quality document;

a suspense queue for storing said plurality of extremely poor-quality documents for which it has been determined said plurality of extremely poor-quality documents are too extreme in poor quality for any additional automated processing, wherein for each of the plurality extremely poor-quality documents two files are produced: (i) an original unadulterated PDF document; and (ii) a report stating one or more reasons for rejecting said each of the plurality of extremely poor-quality documents for further automated processing;

an output queue populated with said plurality of high quality documents determined to meet or exceed predetermined quality standards, said plurality of documents including: (i) a plurality of original high-quality documents; and (ii) a plurality of derived high-quality documents; and an optimizer process to receive the plurality of low quality documents and to select and apply one or more tailored optimization techniques based on the plurality of quantitative values extracted by the extraction process for each of the plurality of low quality documents to improve a quality of said low quality documents and to return a plurality of low quality optimized documents to the extraction process for reprocessing, wherein said property extraction process includes:

a letter placement and page alignment functional operation to: (i) detect a placement and composition of letter content; (ii) to determine page segmentation; and (iii) to detect a presence of white space between page segments and margins.

18. An imaged document processing apparatus comprising a non-transitory computer readable media having encoded thereon a plurality of instructions causing a processor to perform:

an input queue for accepting a plurality of imaged documents;

an extraction process to extract a plurality of quantitative values from each of said plurality of imaged documents; and a classifier algorithm to receive said plurality of quantitative values to sort each of the plurality of imaged document into one of a plurality of classes using the plurality of quantitative values, said plurality of classes including: (i) an extremely poor-quality document; (ii) a low-quality document; and (iii) a high-quality document;

a suspense queue for storing said plurality of extremely poor-quality documents for which it has been determined said plurality of extremely poor-quality documents are too extreme in poor quality for any additional automated processing, wherein for each of the plurality extremely poor-quality documents two files are produced: (i) an original unadulterated PDF document; and (ii) a report stating one or more reasons for rejecting said each of the plurality of extremely poor-quality documents for further automated processing;

an output queue populated with said plurality of high quality documents determined to meet or exceed predetermined quality standards, said plurality of documents including: (i) a plurality of original high-quality documents; and (ii) a plurality of derived high-quality documents; and an optimizer process to receive the plurality of low quality documents and to select and apply one or more tailored optimization techniques based on the plurality of quantitative values extracted by the extraction process for each of the plurality of low quality documents to improve a quality of said low quality documents and to return a plurality of low quality optimized documents to the extraction process for reprocessing, wherein said property extraction process includes:

a typography analysis and detection functional operation to detect one or more typefaces used in a document.

19. An imaged document processing apparatus comprising a non-transitory computer readable media having encoded thereon a plurality of instructions causing a processor to perform:

an input queue for accepting a plurality of imaged documents;

an extraction process to extract a plurality of quantitative values from each of said plurality of imaged documents; and a classifier algorithm to receive said plurality of quantitative values to sort each of the plurality of imaged document into one of a plurality of classes using the plurality of quantitative values, said plurality of classes including: (i) an extremely poor-quality document; (ii) a low-quality document; and (iii) a high-quality document;

a suspense queue for storing said plurality of extremely poor-quality documents for which it has been determined said plurality of extremely poor-quality documents are too extreme in poor quality for any additional automated processing, wherein for each of the plurality extremely poor-quality documents two files are produced: (i) an original unadulterated PDF document; and (ii) a report stating one or more reasons for rejecting said each of the plurality of extremely poor-quality documents for further automated processing;

an output queue populated with said plurality of high quality documents determined to meet or exceed predetermined quality standards, said plurality of documents including: (i) a plurality of original high-quality documents; and (ii) a plurality of derived high-quality documents; and an optimizer process to receive the plurality of low quality documents and to select and apply one or more tailored optimization techniques based on the plurality of quantitative values extracted by the extraction process for each of the plurality of low quality documents to improve a quality of said low quality documents and to return a plurality of low quality optimized documents to the extraction process for reprocessing, wherein said property extraction process includes:

a context and dictionary-based spelling analysis functional operation to perform spelling analysis and enumerate an occurrence of misspelled words using common and domain-specific dictionaries to evaluate acceptability of words, wherein based on a subject matter of a document, one or more preloaded dictionaries of domain-specific acronyms, abbreviations, and initialisms are employed.

\* \* \* \* \*